(12) United States Patent
Cui et al.

(10) Patent No.: US 9,416,667 B2
(45) Date of Patent: Aug. 16, 2016

(54) MODIFIED TURBINE COMPONENTS WITH INTERNALLY COOLED SUPPLEMENTAL ELEMENTS AND METHODS FOR MAKING THE SAME

(71) Applicant: General Electric Company, Schenectady, NY (US)

(72) Inventors: Yan Cui, Greer, SC (US); Ganjiang Feng, Greenville, SC (US); Srikanth Chandrudu Kottilingam, Simpsonville, SC (US); David Edward Schick, Greenville, SC (US); Cem Murat Eminoglu, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 434 days.

(21) Appl. No.: 14/087,381

(22) Filed: Nov. 22, 2013

(65) Prior Publication Data
US 2015/0147164 A1    May 28, 2015

(51) Int. Cl.
| | | |
|---|---|---|
| *F01D 5/18* | (2006.01) |
| *B23P 6/00* | (2006.01) |
| *F01D 5/00* | (2006.01) |
| *F01D 25/14* | (2006.01) |

(52) U.S. Cl.
CPC ............. *F01D 5/188* (2013.01); *B23P 6/005* (2013.01); *F01D 5/005* (2013.01); *F01D 5/18* (2013.01); *F01D 25/14* (2013.01); *B23K 2201/001* (2013.01); *F05D 2230/237* (2013.01); *F05D 2230/80* (2013.01); *F05D 2240/121* (2013.01); *Y02T 50/676* (2013.01); *Y10T 29/49231* (2015.01)

(58) Field of Classification Search
CPC ...................................................... F01D 5/187
USPC .......................... 416/232; 29/889.1, 889.721
See application file for complete search history.

(56) References Cited

U.S. PATENT DOCUMENTS

| | | | |
|---|---|---|---|
| 3,650,635 A | 3/1972 | Wachtell et al. | |
| 4,305,697 A * | 12/1981 | Cohen | B23P 6/005 29/402.13 |
| 4,411,597 A | 10/1983 | Koffel et al. | |
| 4,726,104 A | 2/1988 | Foster et al. | |

(Continued)

FOREIGN PATENT DOCUMENTS

| | | |
|---|---|---|
| EP | 1245691 A2 | 10/2002 |
| EP | 1245691 A3 | 11/2002 |

(Continued)

OTHER PUBLICATIONS

European Search Report and Opinion issued in connection with corresponding EP Application No. 14193486.9 on Mar. 26, 2015.

*Primary Examiner* — Richard Edgar
(74) *Attorney, Agent, or Firm* — Ernest G. Cusick; Frank A. Landgraff

(57) ABSTRACT

Modified turbine components include an original turbine component comprising an outer wall enclosing an internal cavity, wherein the outer wall has an original portion removed therefrom to expose the internal cavity, and, an internally cooled supplemental element joined to the outer wall that replaces the original portion removed from the outer wall and re-encloses the internal cavity. The internally cooled supplemental element comprises one or more cooling channels that circulate air from the internal cavity through at least a portion of the internally cooled supplemental element.

16 Claims, 2 Drawing Sheets

(56) References Cited

U.S. PATENT DOCUMENTS

| | | |
|---|---|---|
| 5,826,332 A | 10/1998 | Bichon et al. |
| 5,836,075 A | 11/1998 | Fitzgerald et al. |
| 6,234,755 B1 | 5/2001 | Bunker et al. |
| 6,265,022 B1 | 7/2001 | Fernihough et al. |
| 7,484,928 B2 | 2/2009 | Arness et al. |
| 8,087,565 B2 | 1/2012 | Kottilingam et al. |
| 8,444,386 B1 * | 5/2013 | Liang ............... F01D 5/186 416/92 |
| 2003/0082048 A1 | 5/2003 | Jackson et al. |
| 2007/0172351 A1 | 7/2007 | Arness et al. |
| 2012/0052200 A1 | 3/2012 | Zimmerman |
| 2012/0156020 A1 | 6/2012 | Kottilingam et al. |

FOREIGN PATENT DOCUMENTS

| | | |
|---|---|---|
| EP | 2317076 A2 | 5/2011 |
| JP | 2009041449 A | 2/2009 |
| WO | 03048528 A1 | 6/2003 |

* cited by examiner

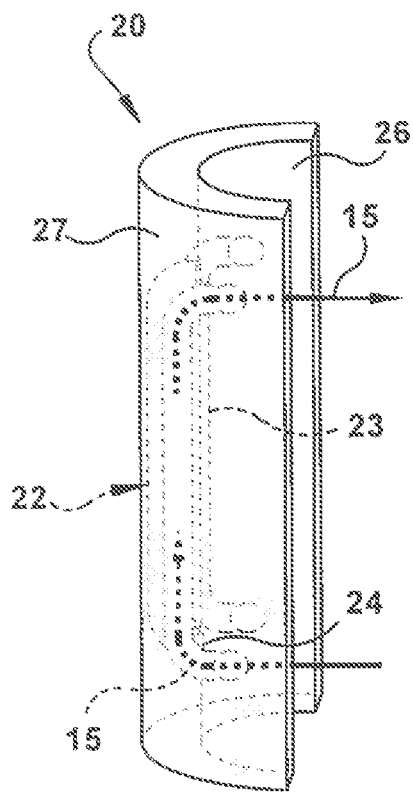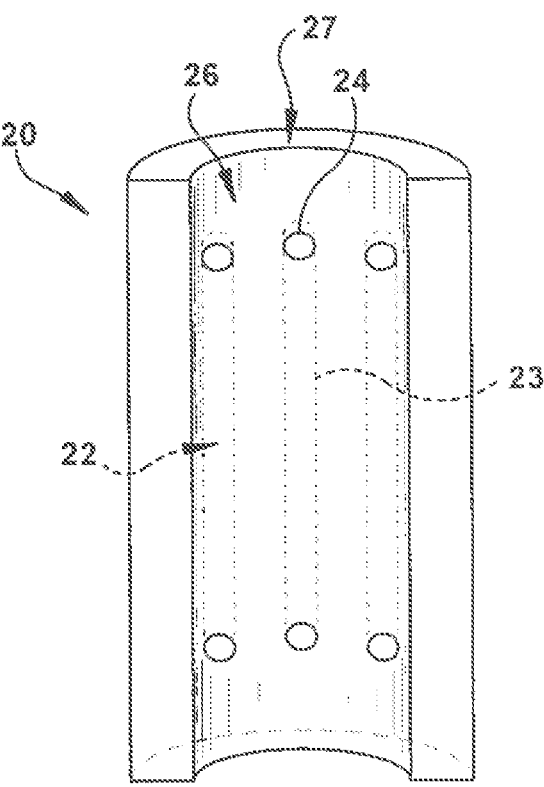
Fig. 3
Fig. 4
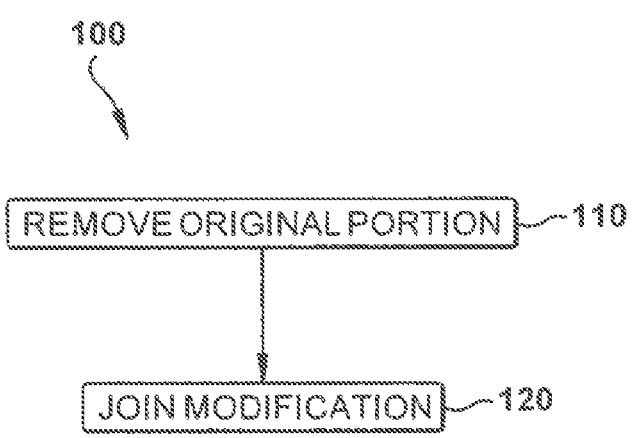
Fig. 5

MODIFIED TURBINE COMPONENTS WITH INTERNALLY COOLED SUPPLEMENTAL ELEMENTS AND METHODS FOR MAKING THE SAME

BACKGROUND OF THE INVENTION

The subject matter disclosed herein relates to turbine components and, more specifically, to modifying turbine components with internally cooled supplemental elements.

In gas turbine engines, such as aircraft engines or heavy duty gas turbines for example, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. For aircraft, the hot exhaust gases may further flow from the back of the engine, driving it and the aircraft forward.

During operation of gas turbine engines, the temperatures of combustion gases may exceed 3,000° F., considerably higher than the melting temperatures of the metal parts of the engine which are in contact with these gases. Operation of these engines at gas temperatures that are above the metal part melting temperatures may depend in part on supplying a cooling air to the outer surfaces of the metal parts through various methods. The metal parts of these engines that are particularly subject to high temperatures, and thus require particular attention with respect to cooling, are the metal parts forming combustors and parts located aft of the combustor, in the so-called "hot gas path". For example, the operating temperatures can be partially regulated by using passageways such as cooling holes incorporated into some engine components such as buckets.

Superalloys, such as precipitation-hardenable Ni-based superalloys, or Co-based superalloys, can be used for turbine components to help withstand higher operating temperatures. However, not all turbine components are originally designed with cooling holes and therefore additional cooling features may be utilized as operating temperatures continue to increase.

Accordingly, alternative modified turbine components with internally cooled supplemental elements and methods for modifying turbine components with internally cooled supplemental elements would be welcome in the art.

BRIEF DESCRIPTION OF THE INVENTION

In one embodiment, a modified turbine component is disclosed. The modified turbine component includes an original turbine component comprising an outer wall enclosing an internal cavity, wherein the outer wall has an original portion removed therefrom to expose the internal cavity, and, an internally cooled supplemental element joined to the outer wall that replaces the original portion removed from the outer wall and re-encloses the internal cavity. The internally cooled supplemental element comprises one or more cooling channels that circulate air from the internal cavity through at least a portion of the internally cooled supplemental element.

In another embodiment, a method for modifying a turbine component is disclosed. The turbine component comprises an outer wall enclosing an internal cavity. The method includes removing an original portion from the outer wall to expose the internal cavity, and joining an internally cooled supplemental element to the outer wall to replace the original portion removed from the outer wall and re-enclose the internal cavity. The internally cooled supplemental element comprises one or more cooling channels that circulate air from the internal cavity through at least a portion of the internally cooled supplemental element.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

FIG. 3 is a side view of an internally cooled supplemental element according to one or more embodiments shown or described herein;

FIG. 4 is a back view of the internally cooled supplemental element of FIG. 3 according to one or more embodiments shown or described herein; and, FIG. 5 is a method for modifying a turbine component according to one or more embodiments shown or described herein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements, The terms "comprising," "including," and "having" are intended to be inclusive and mean that there may be additional elements other than the listed elements.

The present disclosure is generally applicable to turbine components that operate within environments characterized by relatively high temperatures. Notable examples of such turbine components include the high and low pressure turbine buckets (blades), nozzles (vanes), shrouds, and other hot gas path components of a turbine, such as an industrial or aircraft gas turbine engine.

Figure 1:
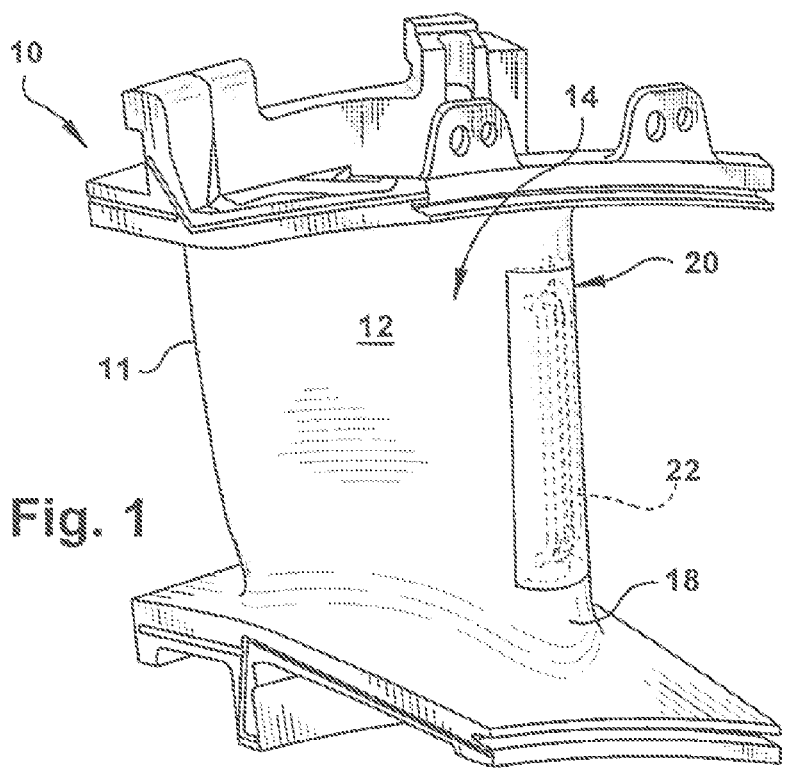
FIG. 1 is a perspective view of a modified turbine component having an internally cooled supplemental element according to one or more embodiments shown or described herein.

Referring now to FIG. 1, an exemplary modified turbine component 10 is illustrated comprising an original turbine component 11 and an internally cooled supplemental element 20. As used herein, "original turbine component" refers to the bulk of the turbine component that is modified through the addition of the internally cooled supplemental element. "Original" only refers to relative state of the turbine component prior to the modification discussed herein, and does not necessarily define a new-make component. For example, the "original turbine component" can refer to a turbine nozzle (as illustrated) that underwent several hours of operation and is ready for modification (e.g., repair or maintenance).

The original turbine component 11 can comprise a variety of turbine components that operate at elevated temperatures. For example, in some embodiments (such as those illustrated in FIGS. 1-2), the original turbine component 11 may comprise a nozzle. However, in other embodiments, the original turbine component may comprise any other turbine component such as buckets, shrouds or the like.

Figure 2:
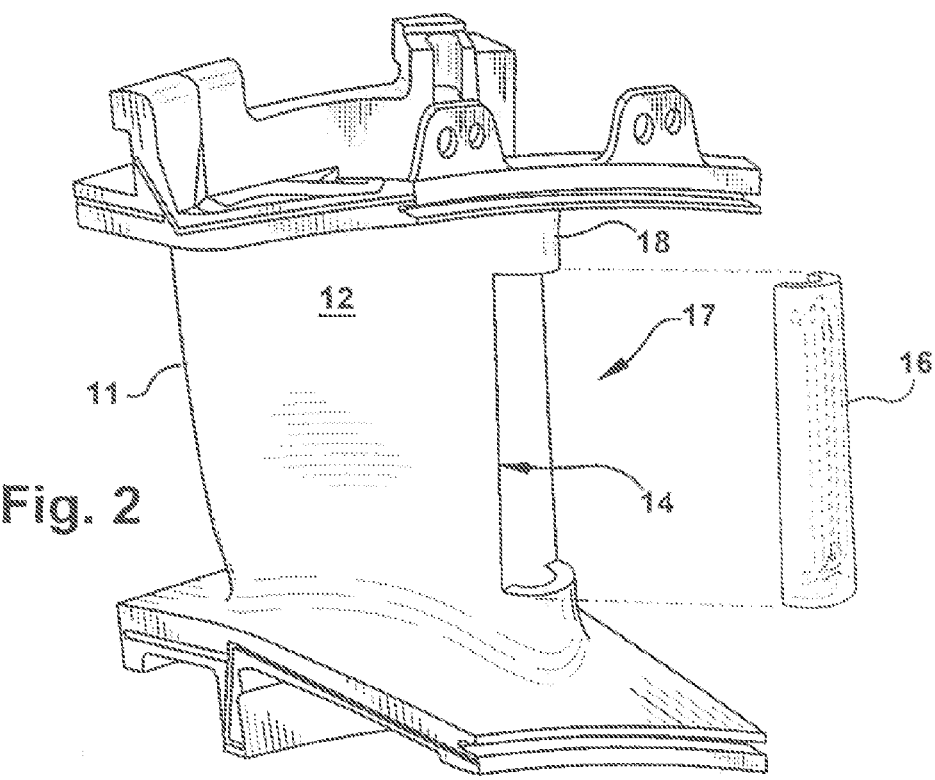
FIG. 2 is an exploded view of an original turbine component with an original portion of its outer wall removed according to one or more embodiments shown or described herein.

Still referring to FIGS. 1 and 2, the modified turbine component 10 (and the original turbine component 11) generally comprises an outer wall 12 enclosing an internal cavity 14. The outer wall 12 may completely enclose the internal cavity 14, or may be just once of a plurality of physical boundaries that all combine to enclose the internal cavity 14. The internal cavity 14 itself can comprise air that can be used for cooling of one or more components during operation of the turbine. For example, the internal cavity 14 may comprise compressor discharge air that may be used for downstream cooling of hot gas path turbine components.

The original turbine component 11 can comprise a variety of materials such as one or more superalloys. In some embodiments, the original turbine component 11 can comprise a nickel-, cobalt-, or iron-based superalloy. For example, the original turbine component 11 can comprise nickel-based superalloys such as René N4, René N5, Rene 108, GTD-111®, GTD-222®, GTD-444®, IN-738 and MarM 247 or cobalt-based superalloys such as FSX-414. The original turbine component 11 may be formed as an equiaxed, directionally solidified (DS), or single crystal (SX) casting to withstand the high temperatures and stresses to which it is subjected such as within a gas turbine engine.

As best illustrated in FIG. 2, an original portion 16 of the outer wall 12 of the original turbine component 11 is removed. The original portion 16 can comprise any portion and any location of the outer wall 12 whose removal exposes the internal cavity 14 (such that the replacement internally cooled supplemental element 20 will form a boundary for the internal cavity 14 as will become appreciated herein). For example, in some embodiments, the original portion 16 may comprise an area targeted for modification (e.g., repair) such as an area showing distress, oxidation, cracks, or the like. In embodiments where the original turbine component 11 comprises a nozzle (as illustrated in FIGS. 1-2), the original portion 16 removed from the outer wall 12 can comprise at least part of the leading edge 18. The leading edge 18 of nozzles (or any similar turbine components) may be the most susceptible to modification due to the higher temperatures they must withstand. As such, removing the original portion 16 from such areas can remedy any potential signs of distress and/or provide new or improved local internal cooling with the modified turbine component 10.

The original portion 16 may be removed by any susceptible method. For example, the original portion 16 may be removed by cutting via lasers, saws, water jet, blades, or the like depending on the material of the original turbine component 11.

Referring to FIGS. 1 and 3-4, the modified turbine component 10 further comprises the internally cooled supplemental element 20. The internally cooled supplemental element 20 is generally shaped to substantially re-enclose the internal cavity 14 by filling the window 17 formed in the original turbine component 11 created by the removal of the original portion 16 of the outer wall 12. For example, the internally cooled supplemental element 20 and the original portion 16 removed from the outer wall 12 may comprise a same shape. By comprising the same (i.e., shared) shape, the internally cooled supplemental element 20 can substantially fill the window 17 created in the outer wall 12. As used herein, "substantially fill" refers to the size, shape and overall profile of the internally cooled supplemental element 20 being substantially matched to the size, shape and profile of the window 17. Thus, where the original portion 16 negatively removed material from the outer wall 12 of the original turbine component 11, the internally cooled supplemental element 20 can positively provide material as a replacement so that the outer profile of the modified turbine component 10 is substantially similar to the outer profile of the original turbine component 11 prior to the removal of the original portion 16 of the outer wall 12.

As best illustrated in FIGS. 3 and 4, the internally cooled supplemental element 20 comprises one or more cooling channels 22 that can circulate air 15 from the internal cavity 14 of the modified turbine component 10. By circulating air 15 internal the internally cooled supplemental element 20, the operating temperature of the internally cooled supplemental element 20 (and potentially the overall modified turbine component 10) may be better regulated through the thermodynamic interaction between the metal/alloy material and the air 15.

The one or more cooling channels 22 can generally comprise at least one internal fluid conduit 23 fluidly connected to one or more cooling holes 24 disposed on an inner wall 26 of the internally cooled supplemental element 20 facing the internal cavity 14. By disposing the one or more cooling holes 24 on the inner wall 26 of the internally cooled supplemental element 20 (i.e., the wall that re-encloses the internal cavity 14), air 15 from the internal cavity 14 (e.g., compressor discharge air used for downstream cooling) can enter the one or more cooling holes 24 for cooling the internally cooled supplemental element 20.

The one or more cooling channels 22 of the internally cooled supplemental element can comprise a variety of configurations and may be based on the specific original turbine component 11 and the location of the original portion 16 removed from its outer wall 12. For example, in some embodiments, a single internal fluid conduit 23 may fluidly connect to two cooling holes 24. In such embodiments, air 15 may enter one of the cooling holes 24, flow through the internal fluid conduit 23, and then exit the second cooling hole 24. In some embodiments, a single internal fluid conduit 23 may fluidly connect to a plurality of cooling holes 24 such as more than two cooling holes. In even some embodiments, the internally cooled supplemental element 20 may comprise a plurality of internal fluid conduits 23, each fluidly connected to their own plurality of cooling holes 24 (such as exemplary illustrated in FIGS. 3 and 4). Moreover, each of the one or more cooling channels 22 can comprise a variety of path designs, either each being similar to, or unique from, the other(s). For example, in some embodiments at least one of the one or more cooling channels 22 may comprise a serpentine configuration (i.e., a flow path that travels back and forth as opposed to a straight line). While specific cooling channel designs have been disclosed herein, it should be appreciated that these designs are not intended to be limiting and other designs (e.g., number, location and configuration of the fluid conduit(s) 23 and cooling hole(s) 24) may additional or alternatively be incorporated.

The internally cooled supplemental element 20 can comprise a variety of materials. For example, in some embodiments, the internally cooled supplemental element 20 can comprise a nickel-, cobalt-, or iron-based superalloy such as those discussed above. In even some of these embodiments, such as when the original turbine component 11 comprises a nozzle or other hot gas path turbine component, the internally cooled supplemental element 20 and the original turbine component 11 may comprise the same material (i.e. share a common material composition).

In some embodiments the original turbine component 11 may have at least one coating on its outer wall 12. The coating may comprise any type of coating that may be suitable for a turbine component when in operation, such as those that assist in thermal, mechanical, or other performance. For example, in some embodiments, such as when the original turbine component 11 comprises a hat gas path component for a turbine, the coating can comprise a thermal barrier coating and/or an environmental barrier coating. Exemplary, but non-limiting coatings include one or more bond coats, transition or intermediate layers, and/or topcoats. Non-limiting materials for the coatings include ceramic materials, a notable example of which is zirconia partially or fully stabilized with yttria (YSZ) or another oxide such as magnesia, ceria, scandia and/or calcia, and optionally other oxides to reduce thermal conductivity. Bond coat materials used in thermal barrier coating systems include oxidation-resistant overlay coatings such as MCrAlX (where M is iron, cobalt and/or nickel, and X is yttrium, a rare-earth metal, and/or another reactive metal), and oxidation-resistant diffusion coatings.

Likewise, the internally cooled supplemental element 20 may comprise at least one coating on its outer wall 27 such as any one or more of the coatings discussed above with respect to the original turbine component 11. In some embodiments, when the original turbine component 11 comprises a coating, the internally cooled supplemental element 20 may also comprise a coating, either the same as or different than the coating on the original turbine component 11. In even some embodiments, the internally cooled supplemental element 20 may comprise at least one coating even when the original turbine component 11 was coating free.

The one or more cooling channels 22 may be present in the internally cooled supplemental element 20 prior to disposing it in the window 17. For example, in some embodiments the one or more cooling channels 22 are formed in the manufacturing of the internally cooled supplemental element 20. In some embodiments, one or more cooling channels 22 are machined (e.g., drilled) into the internally cooled supplemental element 20 post creation of the internally cooled supplemental element 20 but prior to disposing it in the window 17. In some embodiments, the one or more cooling channels 22 may be formed during the casting process of the internally cooled supplemental element 20. In even some embodiments, the internally cooled supplemental element 20 may be produced through additive manufacturing such as selective laser melting (SLM), selective laser sintering (SLS), direct metal laser sintering (DMLS), direct metal laser melting (DMLM) or the like. In such embodiments, the one or more cooling channels 22 may be formed within the internally cooled supplemental element 20 as the entire piece is built up. In even some embodiments, the internally cooled supplemental element 20 and its one or more cooling channels 22 may comprise a plurality of subassemblies bonded together such as through diffusion bonding or brazing.

The internally cooled supplemental element 20 may thereby be joined to the outer wall 12 to replace the original portion 16 removed from the outer wall 12 and re-enclose the internal cavity 14. Joining may occur through any suitable technique or techniques based on the materials of the original turbine component 11 and the internally cooled supplemental element 20. For example, joining may be facilitated through welding (e.g., electron beam welding, arc welding, friction welding or the like) and/or brazing). In some embodiments, such as when the internally cooled supplemental element 20 comprises the same metal or alloy as the original turbine component 11, joining may additionally include weld material, braze material or the like. It should also be appreciated that any type of heating may be utilized such as, but not limited to, induction heating, torches, ovens or any other source(s) to sufficiently bond the materials. In even some embodiments, depending on the material(s), heating may be achieved through friction welding such that the heating process is more localized to the surface regions.

The resulting modified turbine component 10 can thereby comprise a substantially unitary piece comprising both the original turbine component 11 (having an original portion 16 of its outer wall 12 there removed) and an internally cooled supplemental element 20 that replaces the removed original portion 16 to re-enclose the internal cavity 14. The internally cooled supplemental clement 20 comprises one or more cooling channels 22 that can circulate air 15 from the internal cavity 14 through at least a portion of the internally cooled supplemental element 20 when the turbine is in operation. This may allow for a modular modification (e.g., replacement, repair or the like) of one or more portions of a turbine component to alleviate areas of potential distress and/or provide additional thermal control to the modified turbine component 10.

Referring now additionally to FIG. 5, a method 100 is illustrated for modifying a turbine component 11 comprising an outer wall 12 enclosing an internal cavity 14. The method 100 first comprises removing an original portion 16 from the outer wall 12 to expose the internal cavity 14 in step 110. The removal may be achieved through any suitable technique and its location may be about any suitable area of the turbine component 11 as discussed herein.

The method 100 further comprises joining an internally cooled supplemental element 20 to the outer wall 12 to replace the original portion 16 removed therefrom and re-enclose the internal cavity 14. As discussed herein, the internally cooled supplemental element 20 comprises one or more cooling channels 22 can thereby circulate air 15 from the internal cavity 14 through at least a portion of the internally cooled supplemental element 20. Joining may be achieved through any suitable technique and the size, shape and configuration of the internally cooled supplemental element 20 (and its one or more cooling channels 22) may comprise any variety of embodiments as discussed herein.

It should now be appreciated that modified turbine components may comprise internally cooled supplemental elements to provide new and/or replacement cooling channels to one or more portions of the original turbine component. Specifically, the air (e.g., compressor discharge air) that is in the internal cavity of the modified turbine component may now also circulate through the one or more cooling channels of the internally cooled supplemental element to facilitate the forced transfer of heat from the modified turbine component 10. Moreover, this internally cooled supplemental element may also replace one or more areas of distress and/or oxidation about the outer wall of the original turbine component. Such embodiments can avoid having to build up additional material via welding and/or brazing or otherwise having to recycle an entire part. These modifications disclosed herein are further generally applicable to other hot gas path components of industrial and aircraft gas turbine engines, as well as a variety of other components that are subjected to extreme temperatures.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A modified turbine component comprising:
    an original turbine component comprising an outer wall enclosing an internal cavity, wherein the outer wall has an original portion removed therefrom to expose the internal cavity; and,
    an internally cooled supplemental element joined to the outer wall that replaces the original portion removed from the outer wall and re-encloses the internal cavity;
    wherein, the internally cooled supplemental element comprises one or more cooling channels that circulate air from the internal cavity through at least a portion of the internally cooled supplemental element, wherein at least one of the one or more cooling channels comprises an internal fluid conduit fluidly connected to at least two cooling holes disposed on an inner wall of the internally cooled supplemental element facing the internal cavity.

2. The modified turbine component of claim 1, wherein the original turbine component comprises a nozzle.

3. The modified turbine component of claim 2, wherein the original portion removed from the outer wall comprises at least part of a leading edge of the nozzle.

4. The modified turbine component of claim 1, wherein the internally cooled supplemental element comprises a plurality of cooling holes disposed on an inner wall of the internally cooled supplemental element facing the internal cavity, and wherein each of the plurality of cooling holes are fluidly connected to a single internal fluid conduit.

5. The modified turbine component of claim 1, wherein the internally cooled supplemental element and the original portion removed from the outer wall comprise a shared shape.

6. The modified turbine component of claim 1, wherein the air from the internal cavity comprises compressor discharge air.

7. The modified turbine component of claim 1, wherein the original turbine component and the internally cooled supplemental element comprise a same material.

8. The modified turbine component of claim 1, wherein the internally cooled supplemental element is joined to the original turbine component through at least welding or brazing.

9. A method for modifying a turbine component comprising an outer wall enclosing an internal cavity, the method comprising:
    removing an original portion from the outer wall to expose the internal cavity; and,
    joining an internally cooled supplemental element to the outer wall to replace the original portion removed from the outer wall and re-enclose the internal cavity, wherein the internally cooled supplemental element comprises one or more cooling channels that circulate air from the internal cavity through at least a portion of the internally cooled supplemental element, wherein at least one of the one or more cooling channels comprises an internal fluid conduit fluidly connected to at least two cooling holes disposed on an inner wall of the internally cooled supplemental element facing the internal cavity.

10. The method of claim 9, wherein the turbine component comprises a nozzle.

11. The method of claim 10, wherein the original portion removed from the outer wall comprises at least part of a leading edge of the nozzle.

12. The method of claim 9, wherein the internally cooled supplemental element comprises a plurality of cooling holes disposed on an inner wall of the internally cooled supplemental element facing the internal cavity, and wherein each of the plurality of cooling holes are fluidly connected to a single internal fluid conduit.

13. The method of claim 9, wherein the internally cooled supplemental element and the original portion removed from the outer wall comprise a shared shape.

14. The method of claim 9, wherein the air from the internal cavity is compressor discharge air.

15. The method of claim 9, wherein the original turbine component and the internally cooled supplemental element comprise a same material.

16. The method of claim 9, wherein the internally cooled supplemental element is joined to the original turbine component through at least welding or brazing.

* * * * *